US008201234B2

(12) United States Patent
Diaz-Cuellar et al.

(10) Patent No.: US 8,201,234 B2
(45) Date of Patent: Jun. 12, 2012

(54) MULTI-PROFILE INTERFACE SPECIFIC NETWORK SECURITY POLICIES

(75) Inventors: Gerardo Diaz-Cuellar, Redmond, WA (US); David Abzarian, Kirkland, WA (US); Lokesh Srinivas Koppolu, Redmond, WA (US); Eran Yariv, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1419 days.

(21) Appl. No.: 11/746,478

(22) Filed: May 9, 2007

(65) Prior Publication Data

US 2008/0282313 A1 Nov. 13, 2008

(51) Int. Cl.
*H04L 29/06* (2006.01)
(52) U.S. Cl. ........... 726/11; 726/1; 726/2; 726/3; 726/4; 726/5; 726/6; 726/12; 726/13; 726/14; 726/15; 726/22; 726/23; 726/24; 726/25; 713/150; 713/151; 713/152; 713/153; 713/166; 709/200; 709/227; 709/229; 709/245
(58) Field of Classification Search .................. 726/1–6, 726/11–15, 22–25; 713/150–153, 166, 201; 709/200, 227, 229, 245
See application file for complete search history.

(56) References Cited

U.S. PATENT DOCUMENTS

| | | | |
|---|---|---|---|
| 7,171,685 B2 * | 1/2007 | Batra et al. ..................... | 726/14 |
| 2003/0149766 A1 * | 8/2003 | Syvanne et al. ................ | 709/224 |
| 2003/0188192 A1 * | 10/2003 | Tang et al. ..................... | 713/201 |
| 2004/0123139 A1 * | 6/2004 | Aiello et al. ................... | 713/201 |
| 2005/0198283 A1 * | 9/2005 | Ramamoorthy et al. ...... | 709/225 |
| 2006/0070122 A1 * | 3/2006 | Bellovin ......................... | 726/14 |
| 2006/0174336 A1 * | 8/2006 | Chen ............................... | 726/11 |

OTHER PUBLICATIONS

Yang et al., "IPSec/VPN Security Policy Correctness and Assurance", In Proceedings of Journal of high Speed Networking, Special issue on Managing Security Policies: Modeling, Verification and Configuration, 2006, pp. 1-22.*
Mohan et al., "An Editor for Adaptive XML-Based Policy Management of IPSec", Proceedings of the 19th Annual Computer Security Applications Conference, Dec. 2003, 10 pages.*
Perez et al., "Dynamic and secure management of VPNs in IPv6 multi-domain scenarios", Computer Communcations, vol. 29, issue 16, Oct. 2006, pp. 3122-3134.*
Author Unknown, Introduction to Windows Firewall with Advanced Security, Windows Vista, Aug. 2006, 28 pages, Microsoft Corporation, USA.
Author Unknown, The Cable Guy—Jan. 2006, The New Windows Firewall in Windows Vista and Windows Server "Longhorn", Microsoft Technet, http://www.microsoft.com/technet/community/columns/cableguycg0106.mspx?pf, published Jan. 1, 2006, updated Jan. 10, 2007, 9 pages, Microsoft Corporation, USA.

* cited by examiner

*Primary Examiner* — Vivek Srivastava
*Assistant Examiner* — Hee Song
(74) *Attorney, Agent, or Firm* — Merchant & Gould P.C.

(57) ABSTRACT

Computer-readable medium having a data structure stored thereon for defining a schema for expressing a network security policy. The data structure includes a first data field including data defining a parameter to be applied based on the network security policy. The network security policy defines at least one of the following: a firewall rule and a connection security rule. The data structure also includes a second data field having data specifying restrictions of the parameter included in the first data field. The parameter in the first data field and the restrictions in the second data field form the schema for expressing the network security policy to be processed. The network security policy manages communications between a computing device and at least one other computing device.

15 Claims, 6 Drawing Sheets

मल्टी-PROFILE INTERFACE SPECIFIC
MULTI-PROFILE INTERFACE SPECIFIC NETWORK SECURITY POLICIES

BACKGROUND

Computing devices open a gateway for users to the information superhighway by connecting the users to communications networks, such as the Internet. As the Internet environment becomes more complex, this gateway needs to be monitored, controlled, and managed to protect the computing devices and the users. For example, malicious codes, computer viruses, and the like endanger the software and/or hardware of computing devices. The user's personal information, including sensitive financial and identity information, needs to be guarded against intrusions via the communications networks.

Currently, protections such as firewalls, implemented in either hardware or software, manage incoming and outgoing data traffic to and from the computing devices. In addition, separate connection security measures exist so that additional layers of protection may be added. For example, a firewall enables a user to allow or reject connection from a particular computing device. Once the connection is allowed, the user can further set conditions for that connection. For example, the user may elect to encrypt the data transmitted when the connection is active. Alternatively, the user may wish to set an authentication certificate before establishing the connection.

Existing practices separate these two protection mechanisms, and such separation creates management difficulties and redundancy in managing the traffic to and from a user's computing device. For example, the user needs to manage the firewall settings or conditions separately from managing connection security issues. The underlying implementation and code base for each mechanism operate differently, but yet have some overlapping functions. In addition, these mechanisms lack a common language such that the user or developer lacks the ability to query the underlying conditions.

SUMMARY

Embodiments of the invention enhance management of network traffic and communications by defining a common language and/or a common schema for expressing network security rules to handle both firewall rules or settings and connection security settings or preferences. Further aspects of the invention provide flexible incorporation or implementation of the common language/schema in a given group policy. Embodiments of the invention thus beneficially provide a robust and multi-profile interface for controlling and managing network traffic. Alternative aspects of the invention further enable validation, query, importation, export, and other operations on the network security rules using the common language and schema.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

Figure 1:
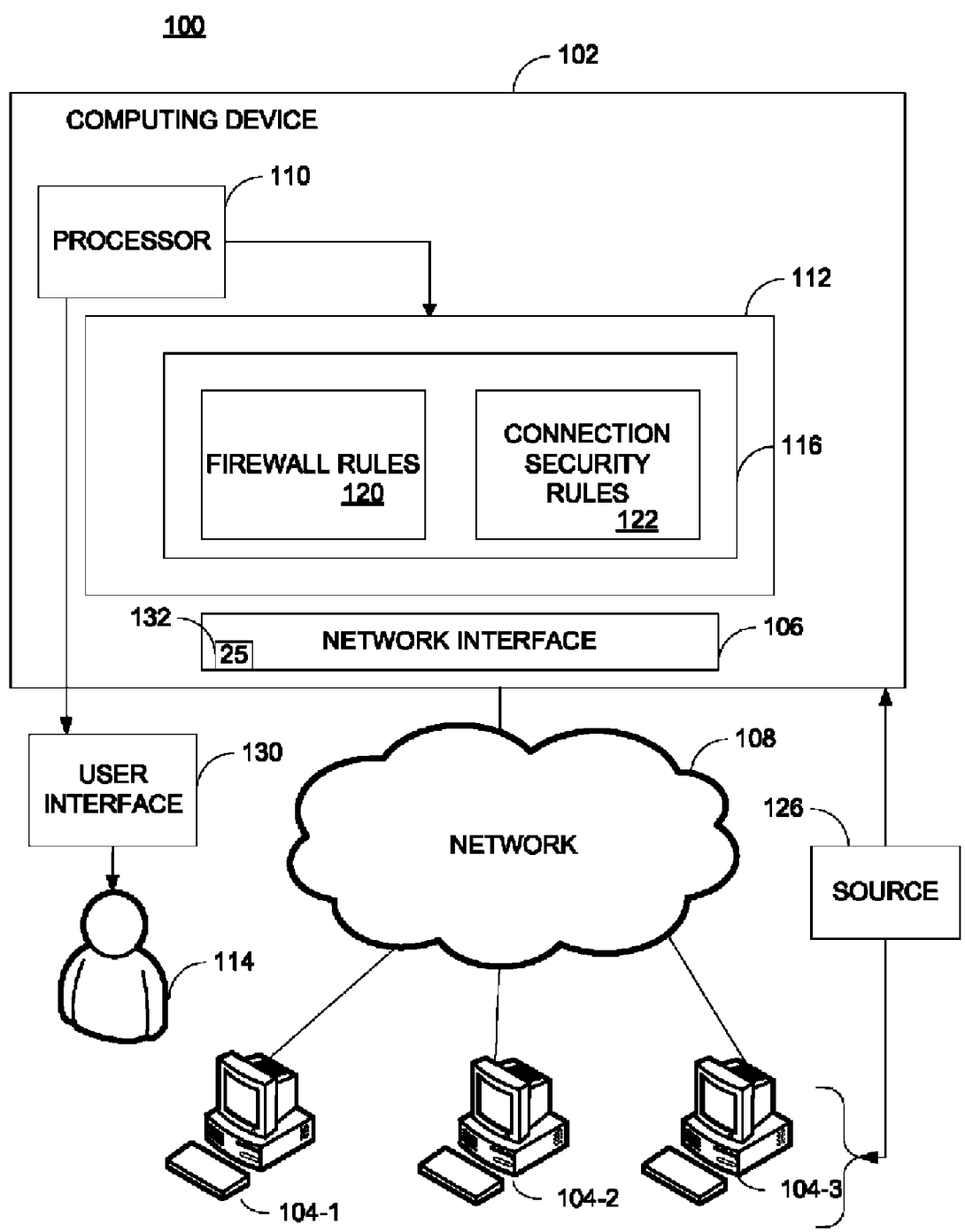
FIG. 1 is a block diagram illustrating a system for controlling network security for a computing device according to an embodiment of the invention.

Appendix A includes Tables 1 to 17 describing exemplary implementations of embodiments of the invention.

Corresponding reference characters indicate corresponding parts throughout the drawings.

DETAILED DESCRIPTION

Aspects of the invention beneficially enhance management and control of network security through the use of network security rules expressed in a common language and schema. Unlike existing practices of separating the management of firewall settings/conditions from connection security settings/conditions or having firewall rules contain limited connection security elements without a coherent schema, embodiments of the invention provide one common language and schema for expressing both firewall settings/conditions and connection security settings/conditions.

Referring now to FIG. 1, a block diagram illustrates an exemplary system 100 for controlling network security for a computing device according to an embodiment of the invention. In one embodiment, the system 100 includes a computing device 102 and at least one other computing device 104. In the illustrated embodiment, the computing device 102 is a computer, a smartphone, a personal digital assistance (PDA), a portable device (e.g., mobile phones, gaming devices), or other devices capable of executing computer-executable instructions. Likewise, computing device 104 may be any of a variety of devices. The computing device 102 or computing device 104 may be connected to one another or other computer networks using a network interface 106 via a communications network 108. For example, the computing device 102 may be a computer within a networked environment, such as within an enterprise. In this example, the computing device 104 may be a web server providing data/information to the computing device 102.

The computing device 102 includes a processor 110 for executing computer-executable instructions, and a memory area 112 for storing information and data for the computing device 102 and/or a user 114. The memory area 112 stores information including network security rules 116. Each of the network security rules 116 may include one or more firewall rules 120 and one or more connection security rules 122.

In one example, the network security rules 116 define settings, conditions, procedures for controlling and managing traffic and/or communications over the communications network 108. In this example, the network security rules 116 include the firewall rules 120 which are conditions and settings for controlling incoming and outgoing data transmission to and from the computing device 102 or 104. As an illustration, a firewall rule 120 may specify that an internet connection port 25 132 to be opened for simple mail transfer protocol (SMTP). On the other hand, the connection security rules 122 include settings or conditions for controlling the manner in which an allowed connection should proceed. In another embodiment, connection security rules 122 are used for filtering network traffic based on internet protocol security and the associated authentication sets, suites and cryptographic requirements. Using the example above, while the port 25 132 is being opened for data transmission using SMTP, the computing device 102 may specify that the data should be encrypted using one or more encryption schemes.

In an alternative embodiment, a source 126 supplies or pushes the network security rules 116 to the computing device 102 or 104. For example, the source 126 may be a file, an automated computing software component or another computing device that causes data representing the network security rules 116 to the computing device 102 or 104. In this example, the source 126 may be controlled by an administrator in an enterprise or federated network system. In an alternative embodiment, the source 126 may provide update to the network security rule 116. In yet another alternative embodiment, the network security rules 116 are part of a group policy in which all members in the group will receive and apply the network security rules 116.

As such, as the group policy is pushed or delivered to the computing device 102 or 104 from either the source 126 or, otherwise, the computing device 102 or 104 receives the network security rules 116, interprets the content of the rules based on the common language or schema described herein, and executes the network security rules 116 to efficiently control the traffic or communications according to the included firewall rules and the connection security rules from or to the computing device 102 or 104. By the same token, the computing device 102 or 104 may export or deliver the network security rules 116 to another computing device that is able to interpret the content of the network security rules 116.

Still referring to FIG. 1, the computing device 102 provides a user interface (UI) 130 for enabling the user 114 to interact with the computing device 102. For example, the UI 130 enables the user 114 to create or modify the network security rules 116.

Figure 2A:
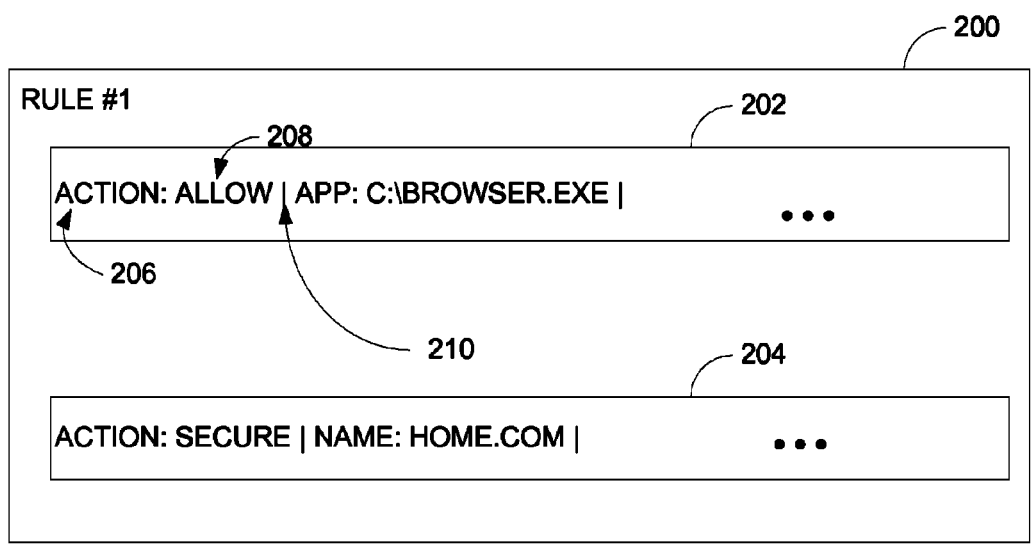
FIG. 2A is a block diagram illustrating a simplified example of a network security rule including a firewall rule and a connection security rule according to an embodiment of the invention.

FIG. 2A illustrates a simplified example of a network security rule 200 including a firewall rule 202 and a connection security rule 204 according to an embodiment of the invention. For example, the network security rule 200 may include a label or an identification (e.g., rule #1). Aspects of an exemplary common language or schema for expressing the firewall rule 202 and the connection security rule 204 are illustrated in Tables 1 through 17 of Appendix A. It is to be understood that Tables 1 through 17 of Appendix A may be supplemented or enhanced without departing from the scope of the invention. As illustrated in FIG. 2A, the firewall rule 202 includes a parameter 206 that may perform an action or specify other condition or settings. For example, the parameter 206 shows an "Action" (as being specified below in Table 1 as one of the parameters). The firewall rule 202 also specifies a restriction 208 for the parameter 206. In this example, the restriction 208 is "ALLOW." A divider 210 divides groups of expressions. As illustrated in FIG. 2A, the firewall rule 202 includes at least two groups of expressions: "Action: ALLOW| Applicant: C:\browser.exe| . . . " It is to be understood that any number of groups of expression may be included in the firewall rule 202. It is also to be understood that the firewall rule 202 or the connection security rule 204 may be used as a base class or basic expression for the network security rule 200, which may include one or more subclasses/sub-expressions of the firewall rule 202, the connection security rule 204, and/or a combination thereof.

Similarly, FIG. 2A illustrates a simplified connection security rule 204 as an example. Like the firewall rule 202, Tables 4 to 17 describe the structure and various parameter values and descriptions for the connection security rule 204. As shown in FIG. 2A, the connection security rule 204 includes the following expression: "Action: SECURE| Name: home.com| . . . "

Because the firewall rule 202 and the connection security rule 204 use the same common schema and language as described in Tables 1 to 17, embodiments of the invention are scalable and can adequately express the firewall settings/conditions and the connection security settings/conditions. Such common language and schema also enable efficient management of the network security rules. Aspects of the invention further permit complex network security rules be expressed and enable re-usable code to set both firewall and connection security settings/conditions.

Figure 2B:
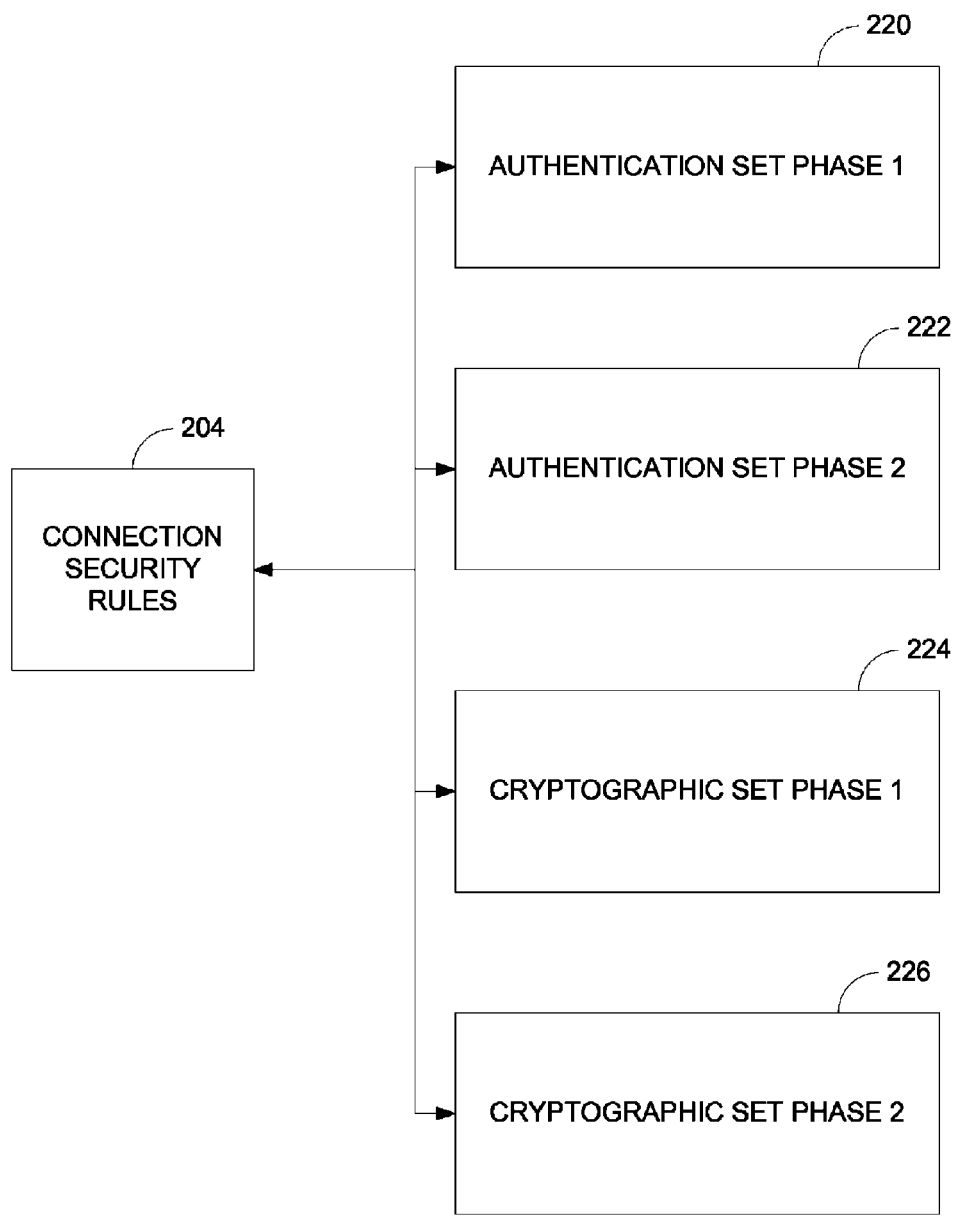
FIG. 2B is an exemplary block diagram illustrating expanded connection security rules according to an embodiment of the invention.

In addition, FIG. 2B is an exemplary block diagram illustrating expanded connection security rules according to an embodiment of the invention. For example, the connection security rules 204 may further include to authentication set phase 1 220, authentication set phase 2 222, cryptographic set phase 1 224, and cryptographic set phase 2 226. Each includes its respective schema parameters and restrictions as described in Tables 7-11 (for authentication) and Tables 12-17 (for cryptography).

Figure 2C:
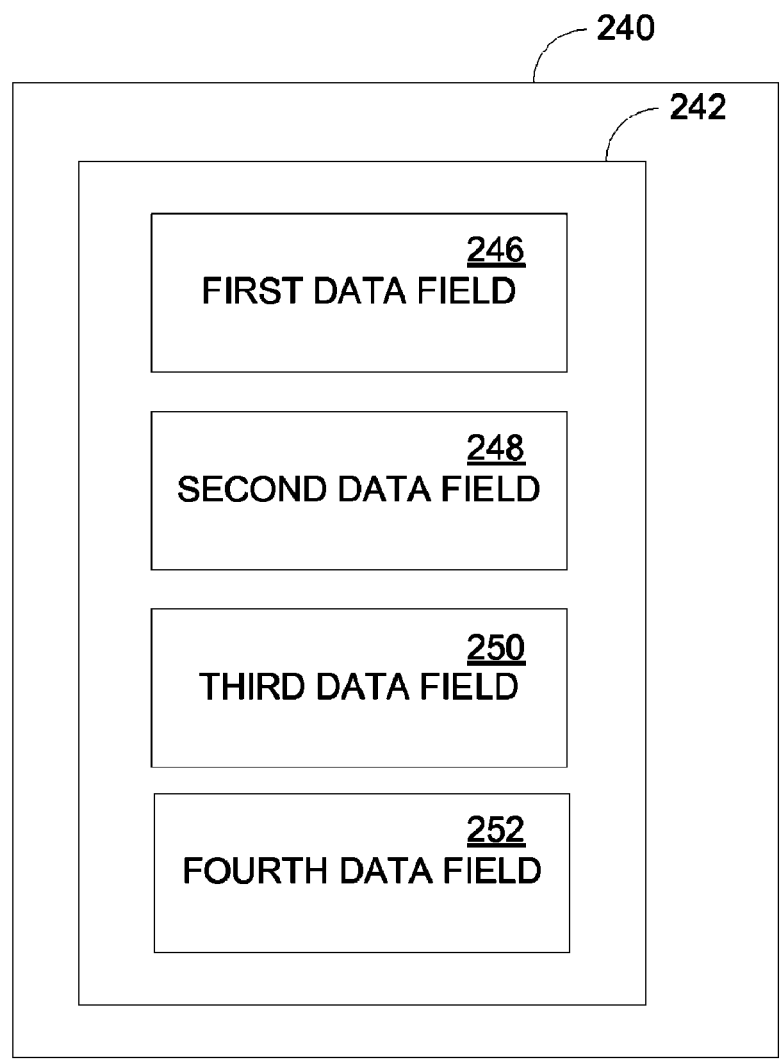
FIG. 2C is a block diagram illustrating a data structure defining a schema for controlling network security for a computing device according to an embodiment of the invention.

FIG. 2C illustrates a computer-readable medium 240 having a data structure 242 stored there on for controlling the network communications of a computing device. The data structure 242 includes a first data field 246 including data defining a parameter to be performed based on the network security policy (e.g., 116). The network security policy defines at least one firewall rule (e.g., 202) and at least one connection security rule (e.g., 204). The data structure 242 also includes a second data field 248 including data specifying restrictions of the parameter included in the first data field 246. The parameter in the first data field 246 and the restrictions in the second data field 248 form a schema for expressing the network security policy to be processed. The network security policy manages communications between a computing device (e.g., computing device 102) and at least one other computing device (e.g., computing device 104).

The data structure 242 further includes a third data field 250 including a default value for the parameter in the first data field 246. In one useful embodiment, the data structure 242 also includes a fourth data field 252 having at least two authentication sets and at least two cryptographic sets. Each of the authentication sets includes a collection of predefined parameters with corresponding predefined restrictions for defining an authentication scheme for the communication between the computing device and the at least one other computing device. Each of the cryptographic sets includes a collection of predefined parameters with corresponding predefined restrictions for defining a cryptographic scheme for the communication between the computing device and the at least one other computing device. It is to be understood that any number of authentication sets or cryptographic sets or any combination thereof may be implemented without departing from the scope of the invention.

Figure 3:
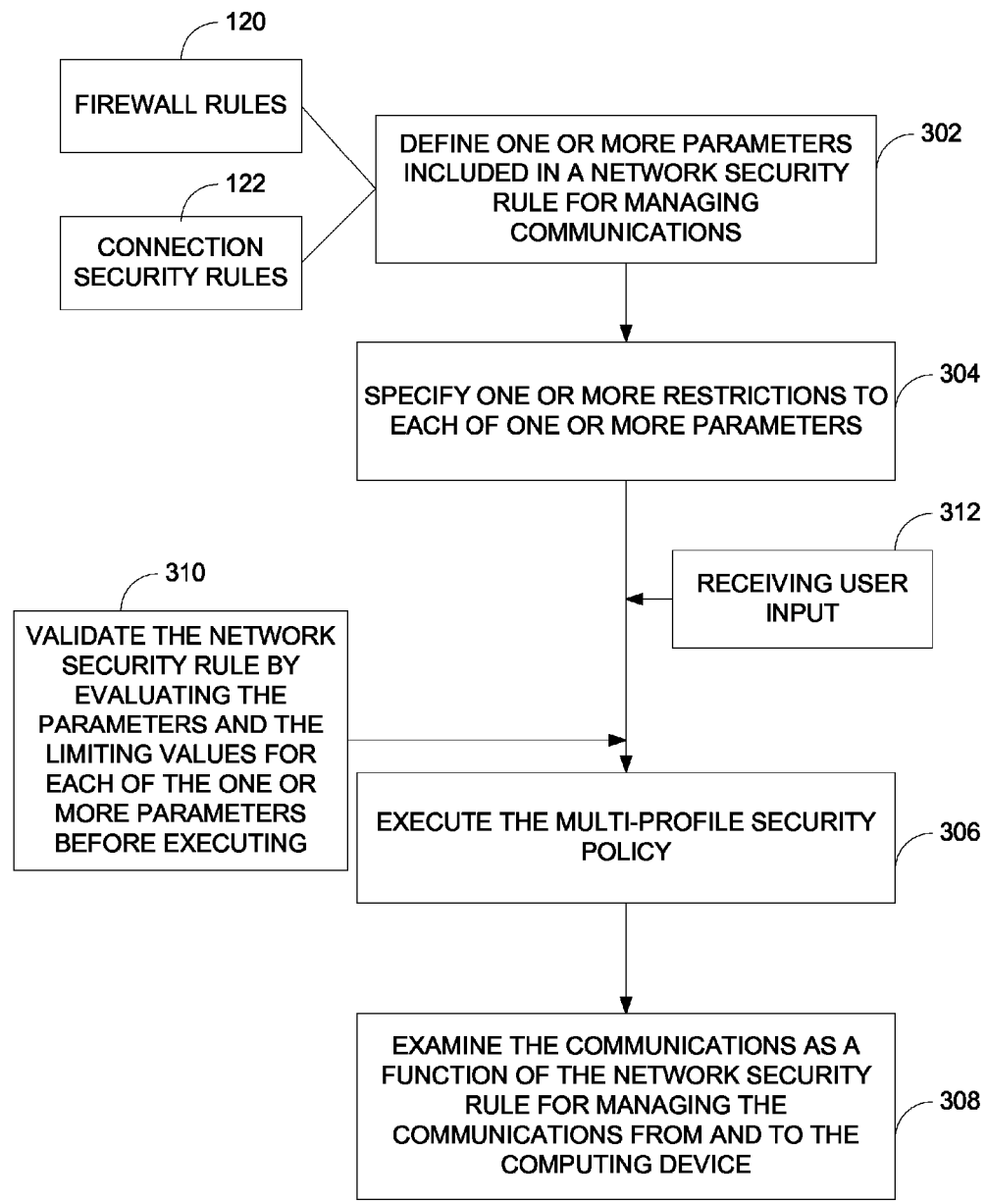
FIG. 3 is an exemplary flow chart illustrating operation of controlling network security for a computing device according to an embodiment of the invention.

Referring now to FIG. 3, a flow chart 300 illustrating operations for controlling network security for a computing device. At 302, one or more parameters included in a network security rule are defined for managing communications between the computing device and at least one other computing device via a data communications network. The network security rule expresses a multi-profile security policy including at least one connection security rule 122 or at least one firewall rule 120. One or more restrictions to each of one or more parameters are specified at 304. The specified one or more restrictions identify limiting values for each of the one or more parameters.

Referring Table 1 as an example, the limiting values define the characteristics of the restriction. For instance, for the parameter "Action," the limiting values for the restrictions of this parameter are "Required: No; Repeatabl: No; Type: Allow, Block, or Bypass." At 306, the network security rule is executed. At 308, the communications are examined as a function of the network security rule for managing the communications from and to the computing device.

In one embodiment, at least one or more of the following restrictions to each of the one or more defined parameters are specified: required restriction, repeatable restriction, and type of restriction. In an alternative embodiment, at 310, the network security rule is validated by evaluating the parameters and the limiting values for each of the one or more parameters before executing. In a further alternative embodiment, user input is received at 312 via the UI 130 for modifying already defined network security rule or creating new network security rule. In another embodiment, the network security rule including the defined parameters and the specified restrictions is received from the memory area for one of the following: the computing device and the at least one other computing device. The received network security rule may include predetermined parameters with corresponding predefined restrictions.

In a further embodiment, the at least one connection security rule includes authentication sets and cryptographic sets. Each of the authentication sets includes a collection of predefined parameters with corresponding predefined restrictions for defining an authentication scheme for the communication between the computing device and the at least one other computing device. Each of the cryptographic sets includes a collection of predefined parameters with corresponding predefined restrictions for defining a cryptographic scheme for the communication between the computing device and the at least one other computing device. The network security rules may also be queried in response to the user input at 312.

Figure 4:
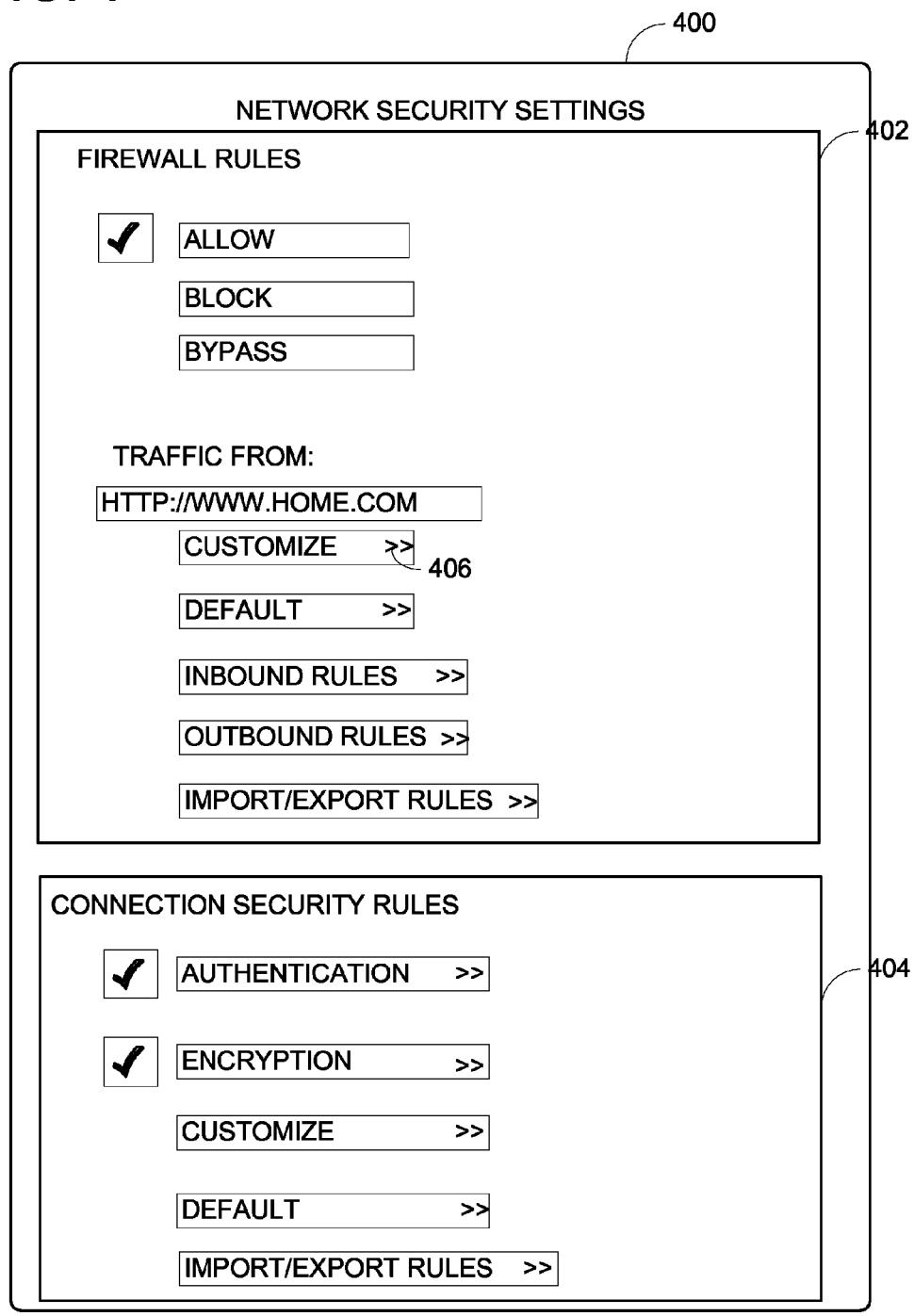
FIG. 4 is a block diagram illustrating graphic user interface (GUI) screen shot for controlling network security for a computing device according to an embodiment of the invention.

FIG. 4 illustrates an exemplary and simplified screenshot 400 for interacting with network security rules. For example, the screenshot 400 illustrates a firewall rules section 402 and a connection security rules section 404. The firewall rules section 402 includes one or more interactive features for defining or modifying firewall rules. For example, as illustrated, the firewall rules section 402 includes setting parameters (e.g., action: allow, block, or bypass) for data from home.com. The firewall rule section 402 also includes operations such as, "customize," default," "inbound rules," "outbound rules," and "import/export rules." It is to be understood that other operations or functions may be added to the section 402 without departing from the scope of the invention.

Similarly, the connection security rule section 404 includes one or more interactive operations for controlling connection security issues. For example, the section 404 includes "authentication," "encryption," "customize," "default," "import/export rules." An indicator 406 associated with one or more of the operations in sections 402 and 404 denotes there are additional options or dialog windows.

In operation, computing device 102 or 104 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Table 1 illustrates an exemplary implementation of a firewall rule schema.

TABLE 1

| Firewall Rule Schema | | | | | |
|---|---|---|---|---|---|
| Schema | | Restrictions | | | Default |
| Parameter | Description | Required | Repeatable | Type | (if optional) |
| Action | The action to be taken for this rule | Yes | No | Enumerated "Allow", "Block" or "ByPass" | N/A |
| Name | The name of the firewall rule | No | No | String or Indirect String | NULL |

TABLE 1-continued

Firewall Rule Schema

| Schema Parameter | Description | Required | Repeatable | Type | Default (if optional) |
|---|---|---|---|---|---|
| Dir | The traffic direction to this rule should apply to | Yes | No | Enumerated "In" or "Out" | N/A |
| App | The process that this rule should apply to | No | No | String | Any |
| Svc | The short service name for the service (with service SID) that this rule should apply to | No | No | String | NULL |
| IF | The specific Interface LUID that this rule should apply to | No | Yes | String | Any |
| IFType | The specific 'friendly' interface type that this rule should apply to | No | Yes | Enumerated "Wireless", "RemoteAccess" or "LAN" | All |
| Profile | The firewall profile that this rule should apply to | No | Yes | Enumerated "Public", "Private" or "Domain" | All |
| LA4 | The local IPv4 address, range or subnet that this rule should apply to | No | Yes | String | Any |
| LA6 | The local IPv6 address, range or subnet that this rule should apply to | No | Yes | String | Any |
| RA4 | The remote IPv4 address, range or subnet that this rule should apply to | No | Yes | String | Any |
| RA6 | The remote IPv6 address, range or subnet that this rule should apply to | No | Yes | String | Any |
| LPort | The local TCP or UDP port that this rule should apply to | No | Yes | String | Any |
| RPort | The remote TCP or UDP port that this rule should apply to | No | Yes | String | Any |
| Protocol | The IANA protocol that this rule should apply to | No | No | String | Any |
| ICMP4 | The ICMPv4 Type and Code that this rule should apply to | No | Yes | String | Any |
| ICMP6 | The ICMPv6 Type and Code that this rule should apply to | No | Yes | String | Any |
| Desc | The description of the firewall rule | No | No | String or Indirect String | NULL |
| Active | This identifies whether the rule is enabled or disabled | No | No | Enumerated "True" or "False" | "True" |
| LSM | This identifies if loose source mapping should be applied to this rule | No | No | Enumerated "True" or "False" | "False" |
| Edge | This identifies if this rule should apply to traffic that traverses the network edge | No | No | Enumerated "True" or "False" | "False" |
| EmbedCtxt | This identifies the group that the firewall rule belongs to | No | No | String or Indirect String | NULL |

TABLE 1-continued

Firewall Rule Schema

| Schema Parameter | Description | Restrictions | | | Default (if optional) |
|---|---|---|---|---|---|
| | | Required | Repeatable | Type | |
| Platform | This identifies which platform this rule should be enforced on | No | Yes | String | Any |
| RMAuth | This identifies which remote machines apply to this rule | No | No | String | NULL |
| RUAuth | This identifies which remote users apply to this rule | No | No | String | NULL |
| Security | This identifies what level security should be enforced for this rule | No | No | Enumerated "Authenticate" "AuthenticateEncyrpt" | NULL |

Table 2 illustrates an exemplary implementation of a firewall rule schema contents.

TABLE 2

Firewall Rule Schema Contents

| Schema Parameter | Contents |
|---|---|
| App | The full path to the application.<br>This can contain environment variables.<br>This can utilize UNC paths. |
| Svc | The short service name for a service that appears in SCM.<br>This can also utilize "*" to specify all service on the system. |
| IF | 128-Bit Interface GUID (this is resolved to a 64-Bit LUID at run-time) |
| LA4 | The local IPv4 address, range or subnet<br>Address="x.y.z.q"<br>Range="x.y.z.q-a.b.c.d"<br>Subnet="x.y.z.q/n" where n represents the number of bits (<=32)<br>Subnet="x.y.z.q/a.b.c.d" where "a.b.c.d" represents the subnet mask<br>Special Keywords |
| LA6 | The local IPv6 address, range or subnet<br>Address="<a valid IPv6 address>"<br>Range="<a valid IPv6 address>-<a valid IPv6 address>"<br>Subnet="<a valid IPv6 address>/n" where n represents the number of bits (<=128)<br>Special Keywords |
| RA4 | The remote IPv4 address, range or subnet<br>Address="x.y.z.q"<br>Range="x.y.z.q-a.b.c.d"<br>Subnet="x.y.z.q/n" where n represents the number of bits (<=32)<br>Subnet="x.y.z.q/a.b.c.d" where "a.b.c.d" represents the subnet mask<br>Special Keywords |
| RA6 | The remote IPv6 address, range or subnet<br>Address="<a valid IPv6 address>"<br>Range="<a valid IPv6 address>-<a valid IPv6 address>"<br>Subnet="<a valid IPv6 address>/n" where n represents the number of bits (<=128)<br>Special Keywords |
| LPort | The local TCP or UDP port<br>Single Port="<Integer>" where the integer is between 0-65535<br>Port Range="<Integer>-<Integer>" where the integers are between 0-65535<br>Special Keywords |
| RPort | The remote TCP or UDP port<br>Single Port="<Integer>" where the integer is between 0-65535<br>Port Range="<Integer>-<Integer>" where the integers are between 0-65535 |
| Protocol | The IANA protocol<br>Protocol=<Integer> where the integer is between 0-255 |
| ICMP4 | ICMPv4 Type and Code<br>ICMPv4="<Integer>:<Integer>" where the integers are |

TABLE 2-continued

Firewall Rule Schema Contents

| Schema Parameter | Contents |
|---|---|
| | between 0-255 |
| | ICMPv4="<Integer>:*" where the integer is between 0-255 |
| ICMP6 | ICMPv6 Type and Code |
| | ICMPv6="<Integer>:<Integer>" where the integers are between 0-255 |
| | ICMPv6="<Integer>:*" where the integer is between 0-255 |
| Platform | OS Version |
| | Platform="<Integer>:<Integer>:<Integer>" where the integers are between 0-255 |
| RMAuth | SDDL String |
| RUAuth | SDDL String |

Table 3 illustrates an exemplary implementation of a firewall rule schema validation.

TABLE 3

Firewall Rule Schema Validation

| Type of Parameter | Exemplary Validation |
|---|---|
| IPv4 Range | The starting address must be <= to the ending address specified in the range |
| IPv6 Range | The starting address must be <= to the ending address specified in the range<br>A loopback address cannot be specified |
| Port Range | The starting port must be <= to the ending port specified in the range |
| Version | For Firewall Rules must be >= 1.0 |
| Name | Between 1 and 10000 characters (if specified) |
| Description | Between 1 and 10000 characters (if specified) |
| App | Must be <= MAX_PATH and must NOT contain "/,*,?,",<,>,\|" |
| Svc | Must be <= MAX_PATH and must NOT contain "/,?,",<,>,\|" |
| EmbedCtxt | Between 1 and 10000 characters (if specified)<br>Must NOT contain "\|" |
| LPort | If "RPC" or "RPC-EPMAP" are specified then the Protocol must be "6" and the direction must be "In"<br>If "TEREDO" is specified then the Protocol must be "17" and the direction must be "In" |
| Protocol | If the Protocol field is not "1", "6", "17" or "58" then LPort, RPort, ICMP4 and ICMP6 must all be NULL |
| LSM | If LSM="True" then Dir != "In" and Protocol !="6" and Security must be NULL |
| Action | If Action="Block" then Security must be NULL<br>If Action="ByPass" then Dir must be "In" and Security must be "Authenticate" or "AuthenticateEncrypt" (with RMAuth not NULL) |
| RMAuth | Between 1 and 10000 characters (if specified)<br>Must NOT contain "\|"<br>Must be a valid security descriptor<br>Must not contain a NULL ACL<br>Must only have either Allow or Deny ACEs<br>Each ACE must have a Filter Match Access Right |
| RUAuth | Between 1 and 10000 characters (if specified)<br>Must NOT contain "\|"<br>Must be a valid security descriptor<br>Must not contain a NULL ACL<br>Must only have either Allow or Deny ACEs<br>Each ACE must have a Filter Match Access Right |
| Security | If Security="Authenticate" or Security="AuthenticateEncrypt" then RMAuth or RUAuth must not be NULL |
| Dir | If Dir="Out" then RUAuth must be NULL |

Table 4 illustrates an exemplary implementation of a connection security rule schema.

TABLE 4

Connection Security Rule Schema

| Schema Parameter | Description | Required | Repeatable | Type | Default |
|---|---|---|---|---|---|
| Action | The action to be taken for this rule | Yes | No | Enumerated "SecureServer", "Boundary", "Secure", "DoNotSecure" | N/A |
| Name | The name of the connection security rule | No | No | String or Indirect String | NULL |
| IF | The specific Interface LUID that this rule should apply to | No | Yes | String | Any |
| IFType | The specific 'friendly' interface type that this | No | Yes | Enumerated "Wireless", "RemoteAccess" or "LAN" | All |

TABLE 4-continued

Connection Security Rule Schema

| Schema Parameter | Description | Restrictions | | | Default |
|---|---|---|---|---|---|
| | | Required | Repeatable | Type | |
| | rule should apply to | | | | |
| Profile | The firewall profile that this rule should apply to | No | Yes | Enumerated "Public", "Private" or "Domain" | All |
| EP1_4 | This is the IPv4 address, range or subnet that should apply to the first endpoint of this rule | No | Yes | String | Any |
| EP1_6 | This is the IPv6 address, range or subnet that should apply to the first endpoint of this rule | No | Yes | String | Any |
| EP2_4 | This is the IPv4 address, range or subnet that should apply to the second endpoint of this rule | No | Yes | String | Any |
| EP2_6 | This is the IPv6 address, range or subnet that should apply to the second endpoint of this rule | No | Yes | String | Any |
| Protocol | The IAA protocol that this rule should apply to | No | No | String | Any |
| EP1Port | The TCP or UDP port that should apply to the first endpoint of this rule | No | Yes | String | Any |
| EP2Port | The TCP or UDP port that should apply to the second endpoint of this rule | No | Yes | String | Any |
| Auth1Set | The is the first authentication set for IPsec (Main Mode) phase negotiation for this connection security rule.. | Yes | No | String | N/A |

TABLE 4-continued

Connection Security Rule Schema

| Schema Parameter | Description | Restrictions | | | |
|---|---|---|---|---|---|
| | | Required | Repeatable | Type | Default |
| Auth2Set | This is the second/optional authentication set for IPsec Extended Mode phase negotiation for this connection security rule. In one embodiment, this may be configured only for AuthIP. | No | No | String | NULL |
| Crypto2Set | This is the (second) cryptographic set for Quick Mode phase that should be applied to this connection security rule. | Yes | No | String | N/A |
| RTunnel4 | This is the IPv4 address of the remote tunnel endpoint this rule should apply to | No | No | String | Any |
| RTunnel6 | This is the IPv6 address of the remote tunnel endpoint for this rule should apply to | No | No | String | Any |
| LTunnel4 | This is the IPv4 address of the local tunnel endpoint this rule should apply to | No | No | String | Any |
| LTunnel6 | This is the IPv6 address of the local tunnel endpoint for this rule should apply to | No | No | String | Any |
| Desc | The description of the connection security rule | No | No | String or Indirect String | NULL |
| Active | This identifies whether the rule is enabled or disabled | No | No | Enumerated "True" or "False" | "True" |
| EmbedCtxt | This identifies the group that | No | No | String or Indirect String | NULL |

TABLE 4-continued

Connection Security Rule Schema

| Schema Parameter | Description | Required | Repeatable | Type | Default |
|---|---|---|---|---|---|
| Platform | the connection security rule belongs to This identifies which platform this rule should be enforced on | No | Yes | String | NULL |

Table 5 illustrates an exemplary implementation of a connection security rule schema content.

TABLE 5

Connection Security Rule Schema Content

| Schema Parameter | Description |
|---|---|
| IF | 128-Bit Interface GUID (this is resolved to a 64-Bit LUID at run-time) |
| EP1_4 | The first endpoint IPv4 address, range or subnet<br>Address="x.y.z.q"<br>Range="x.y.z.q-a.b.c.d"<br>Subnet="x.y.z.q/n" where n represents the number of bits (<=32)<br>Subnet="x.y.z.q/a.b.c.d" where "a.b.c.d" represents the subnet mask<br>Special Keywords |
| EP1_6 | The first endpoint IPv6 address, range or subnet<br>Address="<a valid IPv6 address>"<br>Range="<a valid IPv6 address>-<a valid IPv6 address>"<br>Subnet="<a valid IPv6 address>/n" where n represents the number of bits (<=128)<br>Special Keywords |
| EP2_4 | The second endpoint IPv4 address, range or subnet<br>Address="x.y.z.q"<br>Range="x.y.z.q-a.b.c.d"<br>Subnet="x.y.z.q/n" where n represents the number of bits (<=32)<br>Subnet="x.y.z.q/a.b.c.d" where "a.b.c.d" represents the subnet mask<br>Special Keywords |
| EP2_6 | The second endpoint IPv6 address, range or subnet<br>Address="<a valid IPv6 address>"<br>Range="<a valid IPv6 address>-<a valid IPv6 address>"<br>Subnet="<a valid IPv6 address>/n" where n represents the number of bits (<=128)<br>Special Keywords |
| Protocol | The IANA protocol<br>Protocol=<Integer> where the integer is between 0-255 |
| EP1Port | The first endpoint TCP or UDP port<br>Single Port="<Integer>" where the integer is between 0-65535<br>Port Range="<Integer>-<Integer>" where the integers are between 0-65535 |
| EP2Port | The second endpoint TCP or UDP port<br>Single Port="<Integer>" where the integer is between 0-65535<br>Port Range="<Integer>-<Integer>" where the integers are between 0-65535 |
| Auth1Set | Pointer to an authentication set represented as a string that uniquely identifies the set<br>Please see AuthSet definition |
| Auth2Set | Pointer to an authentication set represented as a string that uniquely identifies the set<br>Please see AuthSet definition |
| Crypto2Set | Pointer to an cryptographic set represented as a string that uniquely identifies the set<br>Please see Crypto2Set definition |
| RTunnel4 | The remote tunnel endpoint IPv4 address<br>Address="x.y.z.q" |

TABLE 5-continued

Connection Security Rule Schema Content

| Schema Parameter | Description |
|---|---|
| RTunnel6 | The remote tunnel endpoint IPv6 address<br>Address="<a valid IPv6 address>" |
| LTunnel4 | The local tunnel endpoint IPv4 address<br>Address="x.y.z.q" |
| LTunnel6 | The local tunnel endpoint IPv6 address<br>Address="<a valid IPv6 address>" |
| Platform | OS Version<br>Platform="<Integer>:<Integer>:<Integer>" where the integers are between 0-255 |

Table 6 illustrates an exemplary implementation of a connection security rule schema validation.

TABLE 6

Connection Security Rule Schema Validation

| Type of Parameter | Exemplary Validation |
|---|---|
| Version | For Connection Security Rules must be >= 2.0 |
| Name | Between 1 and 10000 characters (if specified) |
| Description | Between 1 and 10000 characters (if specified) |
| EmbedCtxt | Between 1 and 10000 characters (if specified)<br>Must NOT contain "\|" |
| Protocol | If the Protocol field is not "6" or "17" then EP1Port and EP2Port must all be NULL |
| LSM | If LSM="True" then Dir != "In" and Protocol !="6" and Security must be NULL |
| Action | If Action="DoNotSecure" then Auth1Set, Auth2Set and Crypto2Set must all be NULL<br>If Action !="DoNotSecure" then Auth1Set and Crypto2Set must all NOT be NULL. In one embodiment, either Auth1Set or Crypto2Set may have a NULL value. In another embodiment, |
| Auth1Set/<br>Auth2Set | Between 1 and 1000 characters (if specified)<br>Must NOT contain "\|" |
| RTunnel4/<br>RTunnel6/LTunnel4/<br>LTunnel6 | If specified then EP1Port and EP2Port must all be NULL<br>If specified then EP1_4, EP1_6, EP2_4 and EP2_6 must all NOT be NULL. In one embodiment, if *Tunnel4 is specified then EP*_4 should not be null. In another example, if *Tunnel6 is specified then EP*_4 should not be null.<br>Must not be loopback addresses<br>In another embodiment, the protocol should also be null.<br>You cannot have action of SecureServer or Boundary. |
| Security | If Security="Authenticate" or Security="AuthenticateEncrypt" then RMAuth or RUAuth must not be NULL |
| Dir | If Dir="Out" then RUAuth must be NULL |
| Endpoint IP Address | In one embodiment, the endpoint IP addresses should not include a multicast address. In one example, if specified as ANY, the endpoint IP addresses are applied to only unicast addresses. |

Table 7 illustrates an exemplary implementation of a connection security authentication sets schema.

TABLE 7

Connection Security Authentication Sets Schema

| AuthSet Fields | Description | Restrictions Required | Type | Default (if optional) |
|---|---|---|---|---|
| Version | Version of the Authentication Set | Yes | String | N/A |
| Name | Name of the Authentication Set | No | String | NULL |
| Description | Description of the Authentication Set | No | String | NULL |
| EmbedCtxt | Reserved | No | String | NULL |

Table 8 illustrates an exemplary implementation of a connection security authentication sets schema validation.

TABLE 8

Connection Security Authentication Sets Schema Validation

| Type of Parameter | Exemplary Validation |
| --- | --- |
| Version | Must be >= 2.0 |
| Description | Between 1 and 10000 characters (if specified) |
| EmbedCtxt | Between 1 and 10000 characters (if specified) Must NOT contain "|" |

Table 9 illustrates an exemplary implementation of a connection security authentication suites schema.

TABLE 9

Connection Security Authentication Suites Schema

| AuthSuites Fields | Phase | Description | Restrictions Required | Type | Default (if optional) |
| --- | --- | --- | --- | --- | --- |
| SkipVersion | Both | This is the minimum version that the engine must be able to handle or it must skip this suite | No | String | "0.0" |
| Method | Phase 1/ Phase 2 | The authentication method | Yes | Enumerated Please see Methods Below | N/A |
| CAName | Both | The name of the certificate authority | No | String | NULL |
| SHKey | Phase 1 | The pre-shared key | No | String | NULL |
| CertAccountMapping | Both | Should certificates be mapped to user/computer accounts? | No | Boolean | "False" |
| ExcludeCAName | Phase 1 | Should the Certificate Authority be excluded from the negotiation? | No | Boolean | "False" |
| HealthCert | Both | Is a health certificate to be used in the negotiation? | No | Boolean | "False" |

Table 10 illustrates an exemplary implementation of a connection security authentication suite methods schema.

TABLE 10

Connection Security Authentication Suite Methods Schema

| Methods Fields | Phase | Description |
| --- | --- | --- |
| Anonymous | Both | Anonymous Authentication Method |
| MachineKerb | Phase 1 | Machine Kerberos Authentication |
| MachineCert | Both | Machine Certificate Authentication |
| MachineSHKey | Phase 1 | Machine Pre-Shared Key Authentication |
| MachineNTLM | Phase 1 | Machine NTLM Authentication |
| UserCert | Phase 2 | User Certificate Authentication |
| UserKerb | Phase 2 | User Kerberos Authentication |
| UserNTLM | Phase 2 | User NTLM Authentication |

Table 11 illustrates an exemplary implementation of a connection security authentication suite methods schema validation.

TABLE 11

Connection Security Authentication Suite Methods Schema Validation

| Type of Parameter | Exemplary Validation |
| --- | --- |
| Method | If Method="MachineCert" or "UserCert" then CAName must be a CERT X500 Name with encoded with X509 ASN<br>If Method="SHKey" then SHKey must not be NULL |

Table 12 illustrates an exemplary implementation of a connection security phase 1 cryptographic sets schema.

TABLE 12

Connection Security Phase 1 Cryptographic Sets Schema

| Crypto1Set | Description | Restrictions Required | Type | Default (if optional) |
| --- | --- | --- | --- | --- |
| Version | Version of the Crypto1Set | Yes | String | N/A |
| Name | Name of the Crypto1Set | No | String | NULL |
| Description | Description of the Crypto1Set | No | String | NULL |
| EmbedCtxt | Reserved | No | String | NULL |
| DoNotSkipDH | Do Not Skip Diffie-Hellman Exchange? | No | Boolean | "False" |
| TimeoutMinutes | Number of minutes until renegotiation must occur | No | String | "1" |
| TimeoutSessions | Number of Phase 2 sessions until renegotiation must occur | No | String | "0" |

Table 13 illustrates an exemplary implementation of a connection security phase 1 cryptographic sets schema validation.

TABLE 13

Connection Security Phase 1 Cryptographic Sets Schema Validation

| Type of Parameter | Exemplary Validation |
| --- | --- |
| Version | Must be >= 2.0 |
| Description | Between 1 and 10000 characters (if specified) |

TABLE 13-continued

Connection Security Phase 1 Cryptographic Sets Schema Validation

| Type of Parameter | Exemplary Validation |
| --- | --- |
| EmbedCtxt | Between 1 and 10000 characters (if specified) Must NOT contain "|" |

Table 14 illustrates an exemplary implementation of a connection security phase 1 cryptographic suites schema.

TABLE 14

Connection Security Phase 1 Cryptographic Suites Schema

| Crypto1Suites | Description | Required | Type | Default (if optional) |
| --- | --- | --- | --- | --- |
| SkipVersion | This is the minimum version that the engine must be able to handle or it must skip this suite | No | String | "0.0" |
| KeyExchange | The key exchange algorithm and strength to be used by the suite. In one example, Diffie Hellman key exchange may be used. | Yes | Enumerated "DH1", "DH2", "ECDH-256", "ECDH-384", "DH2048" | N/A |
| Encryption | The encryption algorithm and strength to be used by the suite | Yes | Enumerated "DES", "3DES", "AES-128", "AES-192", "AES-256" | N/A |
| Hash | The hash algorithm to be used by the suite | Yes | Enumerated "MD5", "SHA-1" | N/A |

Table 15 illustrates an exemplary implementation of a connection security phase 2 cryptographic sets schema.

TABLE 15

Connection Security Phase 2 Cryptographic Sets Schema

| Crypto2Set | Description | Required | Type | Default (if optional) |
| --- | --- | --- | --- | --- |
| Version | Version of the Crypto2Set | Yes | String | N/A |
| Name | Name of the Crypto2Set | No | String | NULL |
| Description | Description of the Crypto2Set | No | String | NULL |
| EmbedCtxt | Reserved | No | String | NULL |
| PFS | The perfect forward secrecy to be used for the Crypto2Set | No | Enumerated "Disabled", "EnabledDHFromPhase1", "ReKeyDH1", "ReKeyDH2", "ReKeyDH2048", "ReKeyECDH256", "ReKeyECDH384" | "Disabled" |

Table 16 illustrates an exemplary implementation of a connection security phase 2 cryptographic suites schema.

TABLE 16

Connection Security Phase 2 Cryptographic Suites Schema

| Crypto2Suites | Description | Restrictions Required | Type | Default (if optional) |
|---|---|---|---|---|
| SkipVersion | This is the minimum version that the engine must be able to handle or it must skip this suite | No | String | "0.0" |
| Protocol | The protocol(s) to be used by the suite | Yes | Enumerated "AH", "ESP", "AH&ESP" | N/A |
| Encryption | The encryption algorithm and strength to be used by the suite | Yes | Enumerated "DES", "3DES", "AES-128", "AES-192", "AES-256" | N/A |
| AHHash | The hash algorithm to be used for Authenticated Header by the suite | Yes | Enumerated "MD5", "SHA-1" | N/A |
| ESPHash | The hash algorithm to be used for the Encapsulated Security Payload by the suite | Yes | Enumerated "MD5", "SHA-1" | N/A |
| TimeoutMinutes | Number of minutes until renegotiation must occur | No | String | "1" |
| TimeoutKBytes | Number of kilobytes that must be exchanged before renegotiation must occur | No | String | "0" |

Table 17 illustrates an exemplary implementation of a connection security phase 2 cryptographic suites schema validation.

TABLE 17

Connection Security Phase 2 Cryptographic Suites Schema Validation

| Type of Parameter | Exemplary Validation |
|---|---|
| TimeoutMinutes | Must be between 5 and 2879 |
| TimeoutKBytes | Between 20480 and 2147483647 |
| Protocol | If Protocol="AH" or "AH&ESP" then AHHash must not be NULL<br>If Protocol="AH&ESP" then AHHash must equal ESPHash<br>If Protocol="AH&ESP" then ESPHash must not be NULL or Encryption must not be NULL. In one embodiment, ESPHash must not be NULL while Encryption may be NULL. |

What is claimed is:

1. A method of controlling network security for a computing device, said method comprising:

defining one or more parameters included in a network security rule for managing communications between the computing device and at least one other computing device via a data communications network, said network security rule expressing a multi-profile security policy including a connection security rule and a firewall rule, the firewall rule comprising an action parameter, a traffic direction parameter, a security level parameter, and a remote user identification parameter;

specifying one or more restrictions to each of the one or more parameters, said specified one or more restrictions identifying limiting values for each of the one or more parameters;

validating the network security rule, further comprising:
evaluating the parameters and the limiting values for each of the one or more parameters;
determining the action parameter corresponds to bypass;
validating the traffic direction parameter corresponds to incoming traffic;
validating the remote user identification parameter is present and contains a non-NULL value; and
validating the security level parameter is present and corresponds to either Authenticate or AuthenticateEncrypt;

executing the network security rule; and examining the communications as a function of the network security rule for managing the communications from and to the computing device.

2. The method of claim 1, wherein specifying one or more restrictions further comprises specifying one or more of the following restrictions to each of the one or more parameters: required restriction, repeatable restriction, and type of restriction.

3. The method of claim 1, further comprising providing the network security rule including the defined parameters and the specified restrictions from a memory area to the computing device and the at least one other computing device.

4. The method of claim 1, wherein the at least one connection security rule includes at least two authentication sets and at least two cryptographic sets, said each of the authentication sets including a collection of predefined parameters with corresponding predefined restrictions for defining an authentication scheme for the communication between the computing device and the at least one other computing device, said each of the cryptographic sets including a collection of predefined parameters with corresponding predefined restrictions for defining a cryptographic scheme for the communication between the computing device and the at least one other computing device.

5. The method of claim 1, further comprising defining a set of network security rules in the memory area, wherein the set of the network security rules include predefined parameters with corresponding predefined restrictions.

6. The method of claim 1, wherein:

the firewall rule includes at least a first parameter selected from the group consisting of (a) an indication of an application that the firewall rule applies to, and (b) a short service name for the service that this rule should apply to.

7. The method of claim 1, wherein: the firewall rule includes an identification of a remote user that the firewall rule applies to.

8. The method of claim 1, wherein: the firewall rule contains a first profile parameter, the value associated with the first profile parameter indicating a first profile to which the firewall rule should apply;

the connection security rule contains a second profile parameter, the value associated with the second profile parameter indicating a second profile to which the connection security rule should apply.

9. The method of claim 8, wherein:

the first profile parameter indicating a first plurality of profiles to which the firewall rule should apply; the second profile parameter indicating a second plurality of profiles to which the connection security rule should apply.

10. A computer-readable medium having a data structure stored thereon for defining a schema for expressing a network security policy, the computer readable medium not consisting of propagated signal, said data structure comprising:

a first data field including data defining a parameter to be applied based on the network security policy, said network security policy defining a firewall rule and a connection security rule, the connection security rule comprising an action parameter, the action parameter selected from the group consisting of values corresponding to SecureServer, Boundary, Secure, and DoNotSecure; and a second data field including data specifying restrictions of the parameter included in the first data field, wherein the parameter in the first data field and the restrictions in the second data field form the schema for expressing the network security policy to be processed, wherein the network security policy manages communications between a computing device and at least one other computing device.

11. The computer-readable medium of claim 10 further comprising:

a fourth data field including at least two authentication sets and at least two cryptographic sets, each of the authentication sets including a collection of predefined parameters with corresponding predefined restrictions for defining an authentication scheme for the communication between the computing device and the at least one other computing device, and each of the cryptographic sets including a collection of predefined parameters with corresponding predefined restrictions for defining a cryptographic scheme for the communication between the computing device and the at least one other computing device.

12. A system of controlling network security for a computing device, said system comprising:

a memory area storing data for one or more network security rules, said each of the network security rules expressing a security policy including a connection security rule and a firewall rule;

a processor configured to execute computer-executable instructions for:

defining one or more parameters included in each of the one or more network security rules for managing communications between the computing device and at least one other computing device via a data communications network, the one or more network security rules including at least two profiles selected from the group consisting of a public network profile, a private network profile, and a domain-joined network profile;

specifying one or more restrictions to each of one or more parameters, said specified one or more restrictions identifying limiting values for each of the one or more parameters;

executing the network security rules; and examining the communications as a function of the network security rules for managing the communications from and to the computing device.

13. The system of claim 12, wherein the memory area is configured to receive the network security rules including a set of predefined parameters and corresponding predefined restrictions for the computing device and the at least one other computing device.

14. The system of claim 12, further comprising a user interface for enabling a user to interact with the defined parameters and specified restrictions in the network security rules, and the user interface further enables the user to query the network security rules.

15. The system of claim 12, wherein the at least one connection security rule includes at least two authentication sets and at least two cryptographic sets, said each of the authentication sets including a collection of predefined parameters with corresponding predefined restrictions for defining an authentication scheme for the communication between the computing device and the at least one other computing device, said each of the cryptographic sets including a collection of predefined parameters with corresponding predefined restrictions for defining a cryptographic scheme for the communication between the computing device and the at least one other computing device.

* * * * *